US008294946B2

(12) United States Patent
Lutnesky et al.

(10) Patent No.: US 8,294,946 B2
(45) Date of Patent: Oct. 23, 2012

(54) PRINTER

(75) Inventors: Gary G. Lutnesky, Corvallis, OR (US); Sang O. Bradley, Corvallis, OR (US); Raymon D. Burrows, Albany, OR (US); Andreas H. Queisser, Corvallis, OR (US); Dennis T. So, Corvallis, OR (US); Kevin E. Swier, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1782 days.

(21) Appl. No.: 11/451,102

(22) Filed: Jun. 12, 2006

(65) Prior Publication Data

US 2007/0285682 A1 Dec. 13, 2007

(51) Int. Cl.

| | |
|---|---|
| ***G06K 15/10*** | (2006.01) |
| ***G06K 1/00*** | (2006.01) |
| ***G06F 15/00*** | (2006.01) |
| *G06K 15/02* | (2006.01) |
| *G06K 15/00* | (2006.01) |
| *G06F 3/12* | (2006.01) |
| *H04N 1/40* | (2006.01) |
| *B41J 29/38* | (2006.01) |
| *B41J 2/05* | (2006.01) |

(52) U.S. Cl. ........ 358/1.8; 358/1.9; 358/1.11; 358/1.15; 358/1.16; 358/2.1; 347/57; 347/5; 347/9

(58) Field of Classification Search .................. 358/1.5, 358/1.12–1.18; 347/10, 188, 17, 11, 109, 347/23, 15, 171, 37, 5, 9, 57, 22

See application file for complete search history.

(56) References Cited

U.S. PATENT DOCUMENTS

| | | | | |
|---|---|---|---|---|
| 5,634,730 | A | 6/1997 | Bobry | |
| 5,940,652 | A * | 8/1999 | Hirakawa | 399/8 |
| 6,099,103 | A * | 8/2000 | Takahashi | 347/11 |
| 6,261,009 | B1 | 7/2001 | Petteruti et al. | |
| 6,371,672 | B1 | 4/2002 | Pirie et al. | |
| 6,478,396 | B1 * | 11/2002 | Schloeman et al. | 347/12 |
| 6,554,392 | B2 * | 4/2003 | Vega et al. | 347/23 |
| 6,561,614 | B1 * | 5/2003 | Therien et al. | 347/19 |
| 6,631,964 | B2 * | 10/2003 | Askeland et al. | 347/15 |
| 6,769,360 | B2 | 8/2004 | Wallig | |
| 6,776,544 | B2 | 8/2004 | Jauert | |
| 6,808,248 | B1 * | 10/2004 | Brugu et al. | 347/37 |
| 6,819,448 | B2 * | 11/2004 | William et al. | 358/1.5 |
| 6,825,951 | B1 * | 11/2004 | Vives et al. | 358/1.8 |
| 7,029,084 | B2 * | 4/2006 | Schloeman et al. | 347/9 |
| 7,054,019 | B1 * | 5/2006 | Simpson | 358/1.15 |
| 7,222,936 | B2 * | 5/2007 | Griesemer et al. | 347/37 |
| 7,245,227 | B2 * | 7/2007 | Winter et al. | 340/686.2 |
| 7,264,326 | B2 * | 9/2007 | Kubo et al. | 347/17 |
| 7,391,427 | B2 * | 6/2008 | LeBlanc | 347/188 |
| 7,411,599 | B2 * | 8/2008 | Geserich et al. | 347/171 |
| 7,413,288 | B2 * | 8/2008 | Sheahan et al. | 347/57 |
| 7,424,625 | B2 * | 9/2008 | Kawanabe | 713/300 |
| 7,426,050 | B2 * | 9/2008 | Silverbrook | 358/1.15 |
| 7,887,877 | B2 * | 2/2011 | Morimoto et al. | 427/66 |
| 7,891,748 | B2 * | 2/2011 | Sheahan et al. | 347/5 |

(Continued)

FOREIGN PATENT DOCUMENTS

JP 1035026 2/1989

(Continued)

*Primary Examiner* — Satwant Singh

(57) ABSTRACT

Various embodiments and methods related to a printer are disclosed.

29 Claims, 5 Drawing Sheets

U.S. PATENT DOCUMENTS

| | | | | |
|---|---|---|---|---|
| 7,891,749 | B2 * | 2/2011 | Sheahan et al. | 347/9 |
| 2003/0076374 | A1 * | 4/2003 | Askeland et al. | 347/15 |
| 2003/0202213 | A1 * | 10/2003 | Saito | 358/1.18 |
| 2004/0061878 | A1 * | 4/2004 | Vives et al. | 358/1.8 |
| 2004/0233249 | A1 * | 11/2004 | Vanhooydonck | 347/41 |
| 2005/0088473 | A1 * | 4/2005 | Holstun et al. | 347/17 |
| 2005/0128233 | A1 * | 6/2005 | Barkley et al. | 347/11 |
| 2005/0248604 | A1 * | 11/2005 | Schremp | 347/19 |
| 2005/0270550 | A1 * | 12/2005 | Sumio | 358/1.13 |
| 2006/0139695 | A1 * | 6/2006 | Chang | 358/3.06 |
| 2007/0146411 | A1 * | 6/2007 | Robertson et al. | 347/22 |
| 2009/0066740 | A1 * | 3/2009 | Silverbrook et al. | 347/10 |
| 2009/0141112 | A1 * | 6/2009 | Bergman et al. | 347/109 |

FOREIGN PATENT DOCUMENTS

| | | |
|---|---|---|
| JP | 9277614 | 10/1997 |
| JP | 09300639 | 11/1997 |
| JP | 09300640 | 11/1997 |
| WO | WO 01/07261 A1 | 2/2001 |

* cited by examiner

PRINTER

CROSS-REFERENCE TO RELATED PATENT APPLICATIONS

The present application is related to copending U.S. patent application Ser. No. 11/208,475 filed on Aug. 19, 2005 by Studer et al. and entitled to PRINTER and co pending U.S. patent application Ser. No. 11/263,456 filed on Aug. 31, 2005 by Studer et al. an entitled PRINTER, the full disclosures of which are hereby incorporated by reference.

BACKGROUND

Handheld printers are sometimes used to print labels another in DCA upon objects. Such handheld printers may utilize complex, expensive and limited electronics.

DETAILED DESCRIPTION OF THE EXAMPLE EMBODIMENTS

Figure 1:
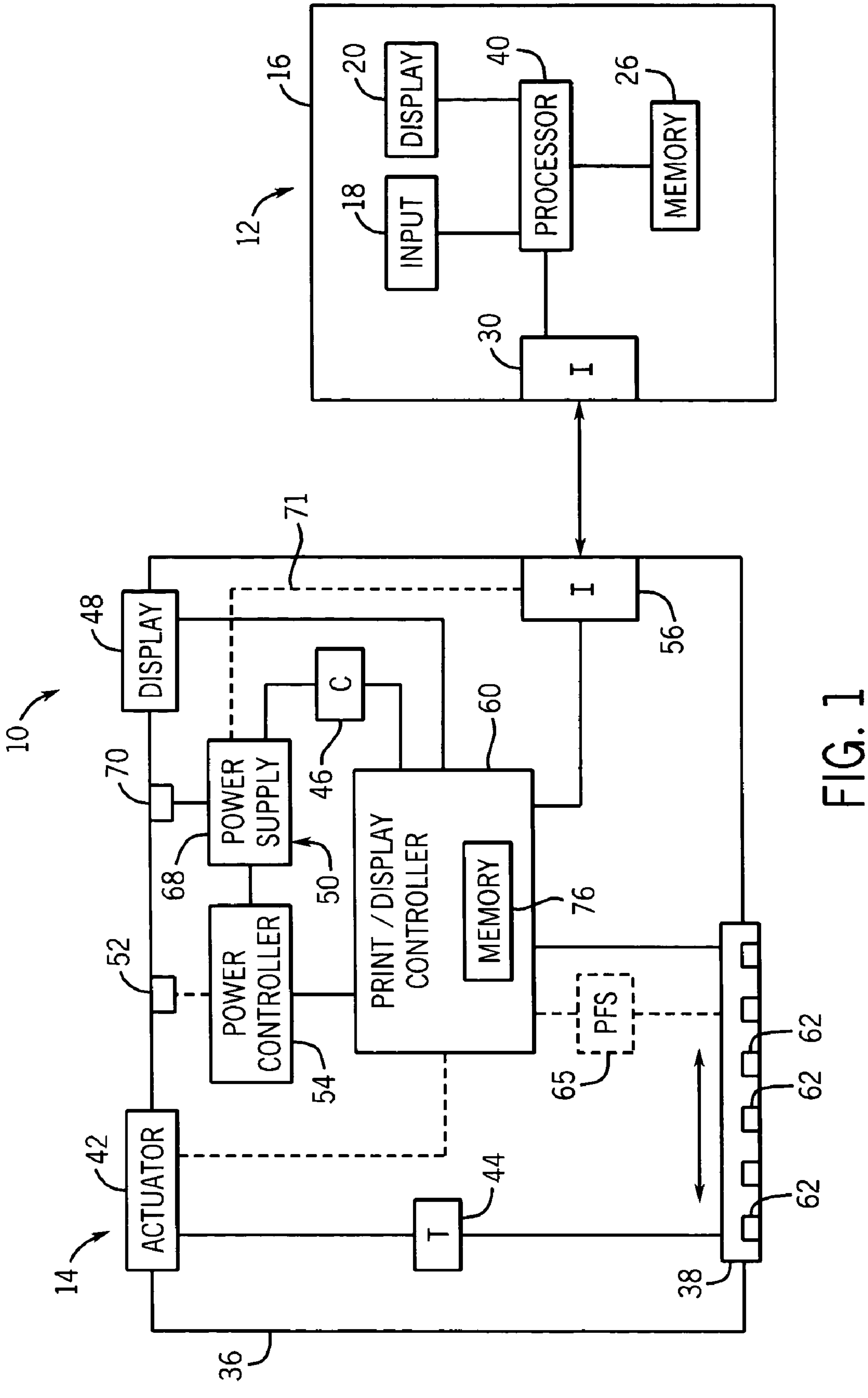
FIG. 1 is a schematic illustration of one example of a printing system according to an example embodiment.

FIG. 1 schematically illustrates one example embodiment of a printing system 10 configured to print one or more materials upon a medium. Printing system 10 generally includes image source 12 and printer 14. Image source 12 comprises a device configured to supply printer 14 with one or more electronic instruction files including nozzle firing instructions and display pixel actuation instructions. In one embodiment, image source 12 comprises a computing device such as a personal computer (i.e. a laptop, desktop or tablet pc, a personal data assistant (PDA)) or other device configured to supply printer 14 with the nozzle firing instructions and/or the display pixel actuation instructions. As will be described in more detail hereafter, because image source 12 generates or supplies printer 14 with such nozzle firing instructions for such pixel actuation instructions rather than such instructions being generated by printer 14 itself, printer 14 may be less expensive, less power consuming and more responsive and more compact.

In the particular embodiment illustrated, image source 12 includes housing 16, input 18, display 20, memory 26, interface 30 and processor 40. Housing 16 comprises one or more structures enclosing and supporting the remaining components of image source 12. Housing 16 defines the outer perimeter of image source 12. Housing 16 may have any of a variety of different sizes, shapes and configurations.

Input 18 comprises one or more devices configured to facilitate inputs to image source 12. In one embodiment, input 18 may be configured to facilitate input of image data or files. For example, in one embodiment, input 18 may comprise a wireless transceiver, a cable connection, or a media card slot or disc tray or slot configured to receive portable memory devices containing image data such as memory cards, optical discs, magnetic discs and the like. Such image data may have various formats such as bitmap, word (.doc), pdf, tiff and various other presently developed or future developed data formats for alphanumeric and graphic images.

In yet other embodiments, input 18 may be configured to facilitate the creation of images using image source 12 or the selection of images stored in memory 26 of image source 12. For example, in one embodiment, input 18 may comprise a manual interaction device such as a keyboard, mouse, touch-pad, microphone or other device that may be used to provide commands to processor 40, facilitating the creation of images or the selection of images.

Display 20 comprise a device configured to provide visual communication with a user of printing system 10. In one embodiment, display 20 may comprise a display screen, such as an LCD screen. In other embodiments, display 20 may comprise a series of other visual indicators such as light emitting diodes and the like, wherein information is communicated by selective lighting of such visual indicators. In particular embodiments, display 20 may be omitted.

Memory 26 comprises a memory storage device configured to store processing instructions for processor 40. In one about it, memory 26 is additionally configured to store image data either created using input 18 and processor 40 or input to source 12 via input 18. Examples of memory 26 include, but are not limited to, random access memory (RAM), flash memory, EEPROM, read only memory (ROM), optical memory storage devices, magnetic storage devices, hard wired memory storage devices or other presently developed or future developed persistent storage devices.

Interface 30 comprises one or more devices or components configured to facilitate communication of the nozzle firing instructions and/or the pixel actuation instructions generated by source 12 to printer 14. In one embodiment, interface 30 may comprise a cable connection facilitating connection of source 12 to printer 14 via an electrical or optical cable, such as a Universal Serial Bus cable. In other embodiments, interface 30 may comprise a wireless transceiver. For example, interface 30 may communicate with printer 14 using infrared, radio frequency or other wireless signals. In still other embodiments, interface 30 may facilitate communication between source 12 and printer 14 in other manners.

Processor 40 comprises one or more processing units configured to generate nozzle firing instructions and/or pixel actuation instructions based upon input received via input 18 and to communicate such instructions to printer 14 via interface 30. For purposes of this disclosure, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Processor 40 is not limited to any specific combination of hardware circuitry and software, nor to any particular source for the instructions executed by the processing unit.

In the particular embodiment illustrated, processor 40 further generates control signals directing operation of display 20 and storage of image data in memory 26. In particular embodiments, processor 40 may be additionally configured to store generated nozzle firing instructions and/or pixel actuation instructions in memory 26 for subsequent use and communication to printer 14. In particular embodiments, processor 40 may be configured to perform additional functions as well.

Printer 14 comprises a device configured to receive nozzle firing instructions from source 12 and to print or deposit printing material, such as ink or toner, upon a medium at least in part upon the received nozzle firing instructions. Printer 14 generally includes housing 36, print head 38, actuator 42, transmission 44, clock 46, display 48, power source 50, power actuator 52, power controller 54, interface 56 and print/display controller 60. Housing 36 comprises one more structures configured to enclose and support the remaining opponents of printer 14. Housing 36 generally defines the outer periphery of printer 14. In one embodiment, housing 36 is configured to contain the remaining components of printer 14 while being sized and dimensioned so as to be comfortably received and held by a single hand of a person. In other embodiments, housing 36 may have any one of a variety of different sizes, shapes and configurations.

Print head 38 comprises a device configured to deposit ink upon a medium. In one embodiment, print head 38 comprises an inkjet print head having nozzles 62 (schematically shown). In one embodiment, such nozzles 62 include resistors (not shown) which upon receiving electrical control signals or current cause the ejection of one or more drops of ink or other printing fluid. In other embodiments, print head 38 may comprise other devices including nozzles configured to eject fluid printing material.

Actuator 42 comprises a manual actuation member movably supported by housing 36 and configured to be manually engaged to initiate printing by print head 38. In one embodiment in which manual force received by actuator 42 is used to move print head 38 relative to housing 36, actuator 42 may be configured to be manually depressed or pulled by a person's finger or hand. In such an embodiment, actuator 42 is physically coupled to print head 38 by transmission 44.

Transmission 44 comprises a mechanism or one or more structures configured to transmit force received by actuator 42 to print head 38 so as to move print head 38 relative to housing 36 to print a swath across a medium. In one embodiment, transmission 44 may include one or more gears, belts, linkages, cams and the like for transmitting force from actuator 42 to print head 38. Because printer 14 uses transmission 44 to transmit force received by actuator 42 to print head 38 to move print head 38 rather than using a separate powered source of force, printer 14 is less complex, less expensive and more compact.

As shown in phantom in FIG. 1, in other embodiments, printer 14 may alternatively (or additionally) include a powered force source 65 configured to move print head 38 relative to housing 36. Examples of such a powered force source 65 include, but are not limited to, a motor, a solenoid, or a cylinder-piston assembly. In such an embodiment, depression or other engagement of actuator 42 actuates powered force source 65 to move print head 38. In one embodiment, controller 60 may generate control signals in response to engagement of actuator 42, wherein powered force source 65 moves print head 38 in response to the control signals from controller 60. In such an embodiment, transmission 44 may be omitted. In yet other embodiments, transmission 44 and powered force source 65 may both be omitted where print head 38 is configured to be substantially stationary with respect to housing 36 during printing.

Clock 46 comprises a real time clock. Clock 46 receives power from power source 50. Clock 46 facilitates the display and/or printing of date or real time values. In other embodiments, clock 46 may be omitted.

Display 48 comprises a liquid crystal display. In other embodiments, display 48 may comprise other devices configured to visually represent information. In other embodiments, display 48 may comprise a series of other visual indicators such as light emitting diodes and the like, wherein information is communicated by selective lighting of such visual indicators. In particular embodiments, display 48 may be omitted.

Power source 50 comprises a source of power for clock 46, controller 60 and print head 38. In one embodiment, power source 50 includes an internal power supply 68 and an external power interface 70. Internal power supply 68 comprises a power storage unit contained within printer 14 for supplying and storing power. One embodiment, internal power supply 68 comprises a lithium-ion battery. In other embodiments, internal power supply 68 may comprise other power storage structures.

External power interface 70 comprises an interface configured to facilitate the connection of printer 14 to an external source of power, such as a DC power transformer. External power interface 70 enables printer 14 to be operated using power transmitted from an external power source or enables internal power supply 68 to be charged. As indicated with broken lines 71, in other embodiments, internal power supply 68 may additionally or alternatively be charged via a connection with interface 70. In such an embodiment, interface 70 may be omitted. In still other embodiments, internal power supply 68 may be omitted in embodiments where power to operate printer 14 is not stored but is directly received from an external source or is directly generated such as from one or more solar cells.

Power actuator 52 comprises a slide, button, switch, toggle or other device facilitating manual input to printer 14 to initiate supply of power from power supply 50 to controller 60.

Power controller 54 comprises one or more components configured to regulate and control transmission of power from power supply 50 to controller 60. In the particular embodiment illustrated, power controller 54 comprises a micro processor configured to monitor activity of printer 14 and to actuate at least portions of printer 14 into a sleep mode during times of little or no activity so as to conserve power. In the example illustrated in FIG. 1, power controller 54 is configured to discontinue transfer of power from power supply 68 to controller 60 after a period of inactivity by controller 60. Power controller 54 resumes transmission of power to controller 60 in response to depression or other actuation of power actuator 52. In the particular embodiment illustrated, power controller 54, itself, enters a sleep mode after a period of inactivity until depression or other actuation of power actuator 52.

Interface 56 comprises a device configured to facilitate communication between image source 12 and printer 14. Interface 56 is configured to receive nozzle firing instructions generated and transmitted by image source 12. In one embodiment, interface 56 is further configured to receive pixel actuation instructions generated and transmitted by image source 12. In one embodiment, interface 56 may comprise a cable connection facilitating connection of source 12 to printer 14 via an electrical or optical cable, such as a Universal Serial Bus (USB) cable. In other embodiments, interface 56 may comprise a wireless transceiver or receiver. For example, interface 56 may communicate with image source 12 using infrared, radiofrequency or other wireless signals. In still other embodiments, interface 56 may facilitate communication between source 12 and printer 14 in other manners.

Print/display controller 60 comprises one or more processing units configured to generate control signals based on nozzle firing instructions received from image source 12 via interface 56. In one embodiment, controller 60 is further configured to generate display control signals based upon pixel actuation instructions received from image source 12 via interface 56. Because controller 60 generates nozzle firing control signals and pixel actuation control signals based upon nozzle firing instructions and pixel actuation instructions prepared or generated by an external device, image source 12, printer 14 may be provided with lesser processing power while maintaining or without substantially increasing the time for printing or providing a display According to one embodiment, controller 60 is additionally configured to modify those control signals based upon the first set of firing instructions received from image source 12 to be based upon a second set of nozzle firing instructions. In one embodiment, the second set of nozzle firing instructions comprise instructions for printing alphanumeric symbols. In one embodiment, the second set of firing instructions may be stored in a memory resident in printer 14. In one embodiment, controller 60 may be associated with a memory 76 configured to store the second set of nozzle firing instructions.

Because the second set of nozzle firing instructions comprise generally a set of predetermined and reused graphics (numbers, letters, punctuation marks and the like), the second set of nozzle firing instructions may be stored in memory 76 for use by controller 60 without utilizing a large amount of memory and may be used to modify or overwrite control signals based upon the first set of firing instructions with lower processing demands. At the same time, the resident second set of firing instructions facilitate customizable modification or labeling of potentially more complex graphics provided by image source 12.

For example, in one embodiment, image source 12 may generate a first set of nozzle firing instructions for a complex drawing, photograph or illustration, which may demand larger processing power. Because image source 12 may have more processing power as compared to printer 14, image source 12 is better able to prepare and package nozzle firing instructions for the complex graphic. This package or file of nozzle firing instructions are transmitted to printer 14 via interfaces 30 and 56. Because the complex graphic has already been converted from a graphic format (bitmap, PDF, Word and the like) to a set of specific nozzle firing instructions, controller 60 may generate control signals using less processing power and time. If a person desires to customize the complex graphic by adding alphanumeric symbols such as his or her name, a greeting, a note and the like, the person may utilize the second set of nozzle firing instructions resident of printer 14. Because such symbols are generally used repeatedly and are generally less complex, storing such instructions on printer 14 not overly burdensome and may achieve a reduced overall printing time by lessening time for transmission of instructions between source 12 and printer 14.

In one embodiment, controller 60 is configured to modify control signals based upon the first set of firing instructions to additionally be based upon a second set of nozzle firing instructions that result in print head 38 printing a current date or time as provided by clock 46. For example, in one embodiment, controller 60 is operably coupled to actuator 42 such that depression or other actuation of actuator 42 triggers the generation of control signals based upon nozzle firing instructions for alphanumeric symbols corresponding to the current date and/or time as provided by clock 46. For example, in one embodiment, actuator 42 may be coupled to an electrical switching device (not shown) which results in a signal being transmitted to controller 60, wherein receipt of such signal causes controller 62 to access clock 46 and to modify the set of control signals using the second set of nozzle firing instructions based on the clock value. Because the second set of nozzle firing instructions for alphanumeric symbols is resident upon printer 14 and because such printing is triggered by depression of actuator 42, the overall time for modifying the set of control signals to additionally direct printing of the current date or time uses less time, allowing the time being printed to be closer in time to the actual time of printing.

In other embodiments, nozzle firing instructions for the current date or time may alternatively be generated are stored by image source 12 and transmitted to printer 14 along with the first set of nozzle firing instructions. In still other embodiments, the triggering of the printing of the current date or time may be in response to other inputs. In other embodiments, controller 60 may omit the additional ability to overwrite the first set of nozzle firing instructions or to modify control signals based on the first set of nozzle firing instructions based on a second set of nozzle firing instructions resident on printer 14.

To further facilitate potentially faster printing while also potentially conserving energy, in one embodiment, controller 60 is further configured to generate control signals preparing nozzles 62 for printing a relatively short time prior to printing. In the example illustrated, controller 60 prepares nozzles 62 for printing in response to a stimulus that is received a relatively short time prior to the transmission or generation of printing control signals by controller 60. For example, in one embodiment, controller 63 warms nozzles 62 in response to force being received by actuator 42. In one embodiment in which print head 38 is moved to as a result of depression of actuator 42, controller 60 generates control signals the prewarming nozzles 62 upon a downstroke of actuator 42. As a result, nozzles 62 are ready and prewarmed a relatively short time prior to printing to reduce printer time and to conserve power. In other embodiments, prewarming of the nozzles may be omitted or may be performed at other times. In such cases, the initiation of printing may occur upon or during a downstroke of actuator 42 as detected by one or more sensors.

Figure 2:
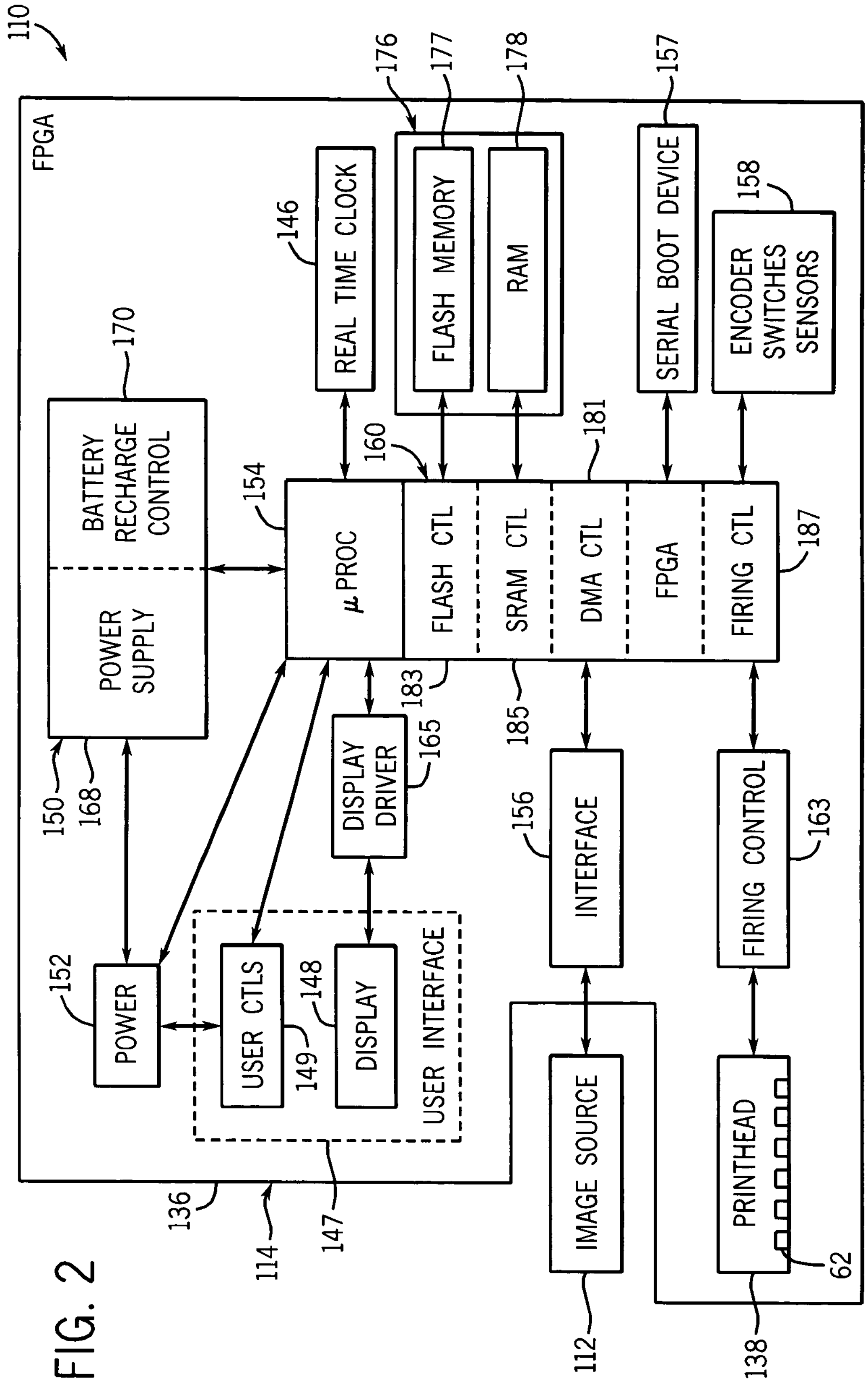
FIG. 2 is a block diagram schematically illustrating another example of the printing system of FIG. 1 according to an example embodiment.

FIG. 2 is a block diagram schematically illustrating printing system 110, one example of printing system 10. Printing system 110 includes image source 112 and printer 114. Image source 112 this similar to image source 12 illustrated and described above with respect to FIG. 1. In a particular example illustrated, image source 112 comprises a computer, such as a personal computer. In other embodiments, image source 112 may comprise other computing devices. Image source 112 includes one or more processing units configured to generate nozzle firing instructions based upon image data. In the example illustrated, the processing units of image source 112 are further configured to generate pixel actuation instructions based upon display data. The nozzle firing instructions and the pixel actuation instructions are communicated to printer 114 and are used by printer 114.

Printer 114 is similar to printer 14. Like printer 14, printer 114 receives nozzle firing instructions from image source 112 and prints images using the already provided nozzle firing instructions. Like printer 14, after 114 also receives pixel actuation instructions from image source 112 and displays images using the already informed pixel actuation instructions. As a result, printer 114 may be less complex and less expensive without substantially sacrificing print quality, print speed, display resolution or display speed.

In a particular example illustrated, printer 114 generally includes housing 136, print head 138, actuator 42 (shown in FIG. 1), transmission 44 (shown in FIG. 1), clock 146, user interface 147 including display 148 and user controls 149, power supply 150, power actuator 152, power controller 154, interface 156, serial boot device 157, encoder switches and sensors 158, and print/display controller 160. Housing 136 is similar to housing 36 and comprises or more structures supporting an enclosing components of printer 114.

Print head 138 is similar to printhead 38 and includes nozzles 62. As additionally shown by FIG. 2, printhead 138 additionally includes a nozzle firing driver or firing controller 163. Firing controller 163 comprise a device configured to selectively transmit electric current to resistors or other devices associate with nozzle 62 to fire or eject ink or other fluid from the nozzle 62. In one embodiment, firing controller 163 may comprise an application-specific integrated circuitry (ASIC).

Actuator 42 and transmission 44 are illustrated and described above with respect to FIG. 1. In the example illustrated, actuator 42 receives manually applied force from a user to initiate printing. The manually applied force is transmitted by transmission 44 to print head 138 to move printhead 138 with respect to housing 136 along a print swath during which Ink are other fluid is ejected onto a medium. In other embodiments, printer 114 the alternatively include a powered force source 65 as described with respect to printer 14 and illustrated in FIG. 1.

Clock 146 is similar to clock 46. In particular, clock 46 is a real time clock configured to provide controller 160 with a current time or date. As a result, clock 146 enables time/date stamping functions.

User interface 147 provides an interface between a user and controller 160. User interface 147 includes display 148 and the user controls 149. Display 148 comprises a liquid crystal display. In other embodiments, display 148 may comprise other devices configured to visually represent information. In other embodiments, display 148 may comprise a series of other visual indicators such as light emitting diodes and the like, wherein information is communicated by selective lighting of such visual indicators. In particular embodiments, display 148 may be omitted. As shown by FIG. 2, display 147 is additionally associated with a display driver 165. Display driver 165 is configured to supply pixels of display 148 with appropriate voltages to selectively actuate the pixels. Display driver 165 supplies appropriate voltages based upon control signals provided by controller 160. In one particular embodiment, display 148 and display driver 165 comprise an FSTN monochromatic type LCD with a "chip on glass" controller or driver. In other embodiments, display 148 and display driver 165 may comprise other types of display devices.

User controls 149 comprise manual interfaces. In one embodiment, user controls 149 comprise push buttons connected directly to controller 160. Such controls facilitate the entering of commands by a user for printing.

Power supply 150 supplies power to controller 160 which further selectively transmits such power to remaining components of printer 114. Power supply 150 includes battery 168 and recharge controller 170. According to one embodiment, battery 168 comprises a lithium ion single cell rechargeable battery associated with a power supply board (not shown) and configured to produce voltages utilized by devices associate with controller 160. The power supply board produce such voltages employing both step-down and step-up switching regulator chips (not shown).

In a particular example illustrated, power supply 150 is further configured to be recharged. The recharge controller 170 facilitates charging of battery 168. In the particular example illustrated, controller 170 is configured such that if printer 114 is plugged into a USB port, power supply 150 receives charging current from the USB port. The charge controller 170 additionally includes a power transformer coaxial connector, allowing battery 168 to be recharged by user. The charging controller is configured such that if printer 114 is connected to a USB port and is also connected to an external power source, such as a DC input, the battery 168 is recharged from the DC input rather than through the USB port.

Power actuator 152 comprises a slide, button, switch, toggle or other device facilitating manual input to printer 114 to initiate supply of power from power supply 150 to controller 160.

Power controller 154 comprises a small microcontroller configured to monitor activity in control power to the components of printer 114 but for clock 146. In the example illustrated, power controller 154 is provided on the same board as controller 160. As with power controller 54 of printer 14, power controller 154 actuates at least portions of printer 114 into a sleep mode during times of little or no activity so as to conserve power. In the example illustrated in FIG. 2, power controller 154 is configured to discontinue transfer of power from battery 168 to controller 160 after a period of inactivity by controller 160. Power controller 154 resumes transmission of power to controller 160 in response to depression or other actuation of power actuator 152. In the particular embodiment illustrated, power controller 154, itself, enters a sleep mode after a period of inactivity until depression or other actuation of power actuator 152.

Interface 156 comprises a device configured to facilitate communication between controller 160 of printer 114 and image source 112. Interface 156 facilitates data transfer to printer 114. Such data transferred includes an image file comprising nozzle firing sequence data or instructions, a display file comprising graphical display data preformatted by image source 112 to match the format used by driver 165 and real-time clock update data. In particular embodiment, interface 156 this further used to recharge battery 168.

In a particular example illustrated, interface 156 comprises a Universal Serial Bus (USB). In particular, interface 156 utilizes a USB FIFO parallel data transfer chip having associated circuitry with a 1K serial EEPROM for device ID. Both the FIFO chip and the associated EEPROM derive power from the USB port common voltage and do not burden battery 168. In other embodiments, interface 156 may have other wired and wireless configurations.

Serial boot device 157 comprise a device configured to reload a logic image to controller 160 upon repowering of controller 160. In other embodiments, device 157 may have other configurations or may be omitted.

Encoder switches and sensors 158 comprised switches and sensors associated with printer 114 and operably communicating with controller 160. Encoder switches and sensors perform multiple functions including, but not limited to, sensing a position of print head 138 with respect to housing 136 and sensing depression or other movement of actuator 142.

Print/display controller 160 comprises one or more processing units configured to generate control signals based on nozzle firing instructions received from image source 112 via interface 156. In one embodiment, controller 160 is further configured to generate display control signals based upon pixel actuation instructions received from image source 112 via interface 156.

As shown by FIG. 2, controller 160 is associated with a memory 176 which includes flash memory 177 and a random access memory 178. Memory 176 stores instructions for directing controller 160. In particular embodiments, memory 176 further facilitate storage of nozzle firing instructions and other operating data for use by printer 114. For example, in one embodiment, memory 176 may store nozzle firing instructions for alphanumeric symbols and predefined graphics. In one embodiment, flash memory 177 includes 2M×8 of flash memory, sufficient capacity for approximately 30 images. Portions of flash memory 177 are further used for program memory for storing instructions for controller 160. In other embodiments, memory 176 may include other forms of memory.

In the particular embodiment illustrated, controller 160 comprises a field programmable gate array (FPGA). Because controller 160 includes an FPGA, controller 160 has relatively large data upload rates to satisfy rates that may be demanded by the print head firing circuitry (ASIC) of firing controller 163. The FPGA is configured to include both FPGA hardware instantiated processor and the custom logic peripherals. The FPGA of controller 160 performs tasks including upper-level device control state machine with interrupt handling, USB FIFO device driver, flash and as RAM data memory management and file selection, user interface and display control, real-time clock and data handling, power supply monitoring and control for invoking the nozzle or pen firing peripheral. The FPGA of controller 60 executes from flash memory 177. The FPGA is configured to include several FPGA logic peripherals which permit a significant reduction in coating and an increase in speed. The logic peripherals are coded as hardware in the FPGA via Verilog Hardware Definition Language (HDL).

Examples of such logic peripherals are shown in FIG. 2 and include, but are not limited to, USB-DMA controller 181, flash memory controller 183, an SRAM controller 185 and firing controller 187. DMA controller 181 is provided on a tri-state bus of controller 160 and drives interface 156 which comprises a USB interface. As result, the USB driver functions of interface 156 may be executed largely as hardware logic peripherals on the FPGA of controller 160, achieving a greater throughput and lowering processor overhead. Controller 181 further serves to port data across the tri-state bus and works in conjunction with a memory management program module and flash memory controller 183.

Flash memory controller 183 is implemented as a hardware logic peripheral within the FPGA and stores data transferred across interface 156 in mapped locations within flash memory 177. SRAM controller 185 accesses RAM memory 178 which contains instructions directing operation of controller 160. Firing controller 187 transmits nozzle firing instructions to nozzle firing controller 163. In other embodiments, such functions performed by the noted logic peripherals may be performed by separate components distinct from the FPGA of controller 160. In yet other embodiments, printer 114 may alternatively include a microcontroller in lieu of the FPGA.

According to one example mode of operation, resident programs of image source 112 create image and display instruction files comprising nozzle firing instructions and pixel actuation instructions, respectively, from a user input image file, such as a bitmap file, a pdf file or other image format. Such programs are called into execution by graphical user interface programs of printer 114 installed and/or running on image source 112. Image source 112 includes an image file generator which creates an image file by converting the user input image file (e.g., bitmap file) into nozzle firing order instructions for use by the firing ASIC of firing controller 163. The display file generator of image source 112 generate a display file by converting the user input image file into a properly formatted text data for the display driver 165. For each printable image to be downloaded to printer 114, these two instruction files (image and display) are created and stored by image source 112. When a user has selected all files to be downloaded to printer 114, a download command may be selected by the user from the graphical user interface program or running on image source 112 to transfer the files to printer 114 across interface 156. Upon receiving the image and display instruction files, controller 160 stores such instruction files in flash memory 177 of memory 176.

When not being utilized, printer 114 is configured to enter into a "sleep" mode to conserve power. Power controller 154 monitors activity of controller 160. When controller 160 has been inactive for a programmable or predetermined amount of time, power controller 154 shuts off power to the main circuit via a high side FET switch, that feeds battery power to power supply voltage regulators. As result, the FPGA of controller 160 and a balance of the circuitry shutdown. Power controller 154 further places itself in a "sleep" mode. However, power controller 154 monitors user controls 149 for activity, such as the depression, which upon being detected awakens power controller 154 from the "sleep" mode and results in re-powering of FPGA of controller 160. Upon power up, serial boot device 157 reloads the logic image to the FPGA of controller 160. The FPGA serves as a central processing unit ready to perform the operations of printer 114.

When a user has positioned printer 114 in the desired location opposite to a medium to be printed upon and begins depression of actuator 42 (shown in FIG. 1), controller 160 generates control signals pre-warming nozzles 62 of print head 38. In the example illustrated, controller 160 pre-warms nozzles 62 during a down-stroke of actuator 42, beginning when one of sensors 158 detects the down-stroke. Pre-warming nozzles 162 is achieved by sending energy pulses sufficient to warm the nozzles of print head 138 but insufficient to fire the nozzles 62

In a particular example illustrated, printing is initiated during an up-stroke of actuator 42 which is detected by a carriage encoder of sensors 158 signaling reverse movement of print head 38. To initiate printing, the FPGA of controller 160 issues a series of configuration instructions to the firing controller 163 using HP MICCI 2 (Multiple IC Control Interface) protocol. Such instructions are followed by streams of firing data accompanied by firing synchronization signals which are based upon movement of print head 138 as detected by the encoder and encoder strip of encoder switches sensors 158. The firing data is derived from the image data instructions previously transferred from image source 112 and loaded in flash memory 177. In other embodiments, the creation of image and display instruction files, the mode by which the image and file instructions are transferred to printer 114, the mode by which the instruction files are stored and accessed, the mode by which printer 114 enters "sleep" mode's, the mode by which nozzles 62 are pre-warmed and the mode by which printing is initiated may be performed in other manners. For example, in other embodiments, the initiation of printing may occur upon or during a downstroke of actuator 42 as detected by one or more sensors.

Figure 3:
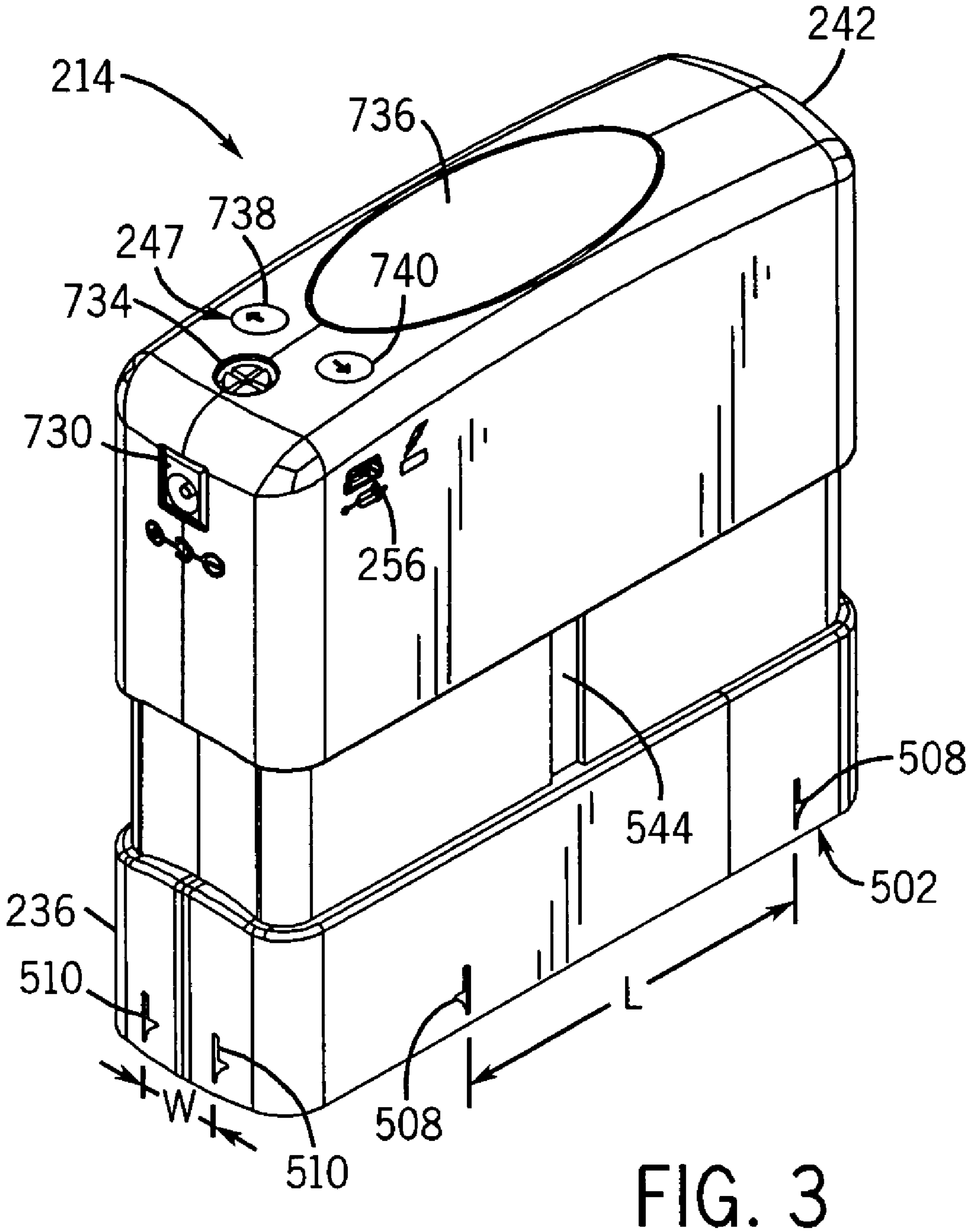
FIG. 3 is a perspective view of one embodiment of a printer of the system of FIG. 2 according to an example embodiment.
Figure 4:
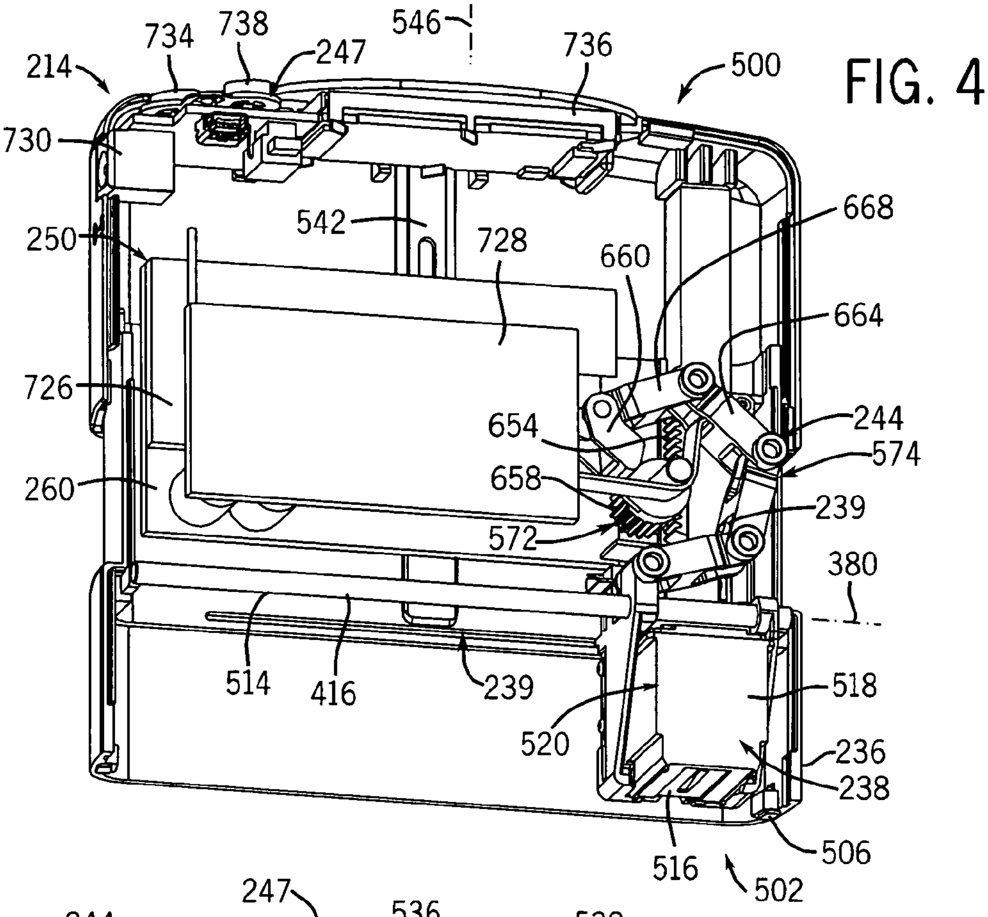
FIG. 4 is a sectional view of the printer of FIG. 3 according to one example embodiment.
Figure 5:
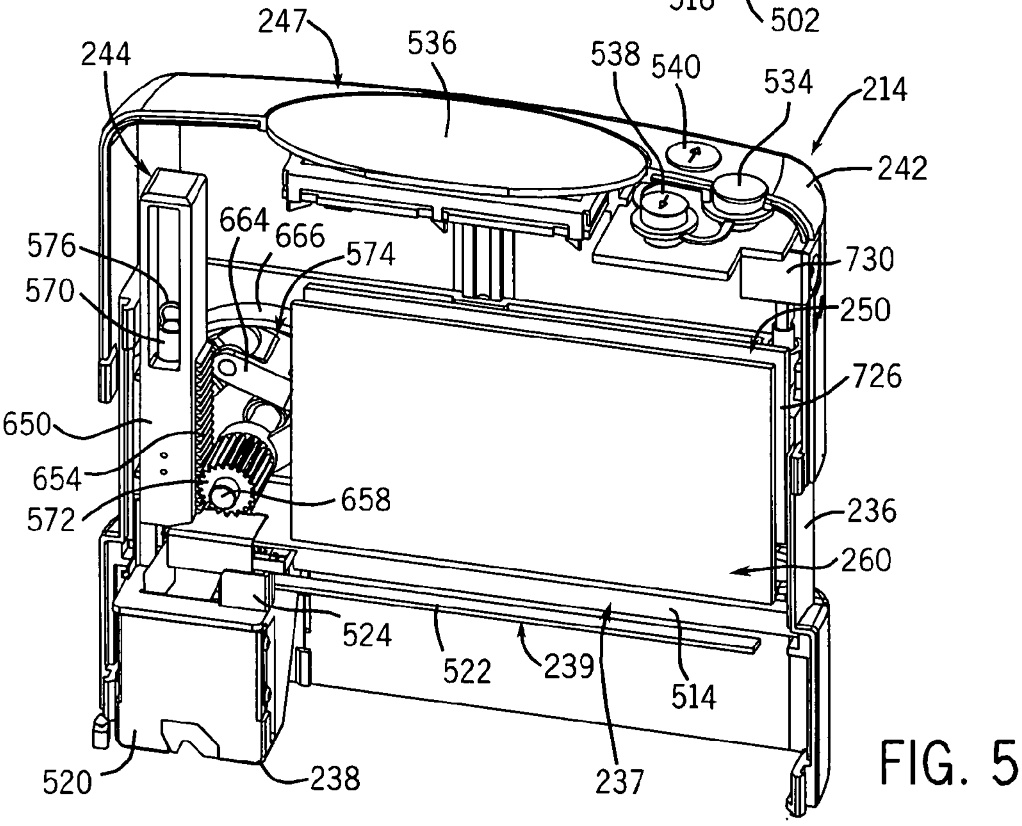
FIG. 5 is a sectional view of the printer of FIG. 3 according to one example embodiment.

FIGS. 3-7 illustrate printer 214, one example of printer 114. As shown by FIGS. 3-5, printer 214 generally includes housing 236, guide 237, print device 238, position sensing device 239, manual actuation member 242, transmission 244, clock 46 (shown and described in FIG. 2), user interface 247, interconnect 249, power source 250, data interface 256 (shown in FIG. 2), and controller 260. Housing 236 is a structure supporting and partially containing the remaining components of printer 214. In the particular example illustrated, housing 236 has an upper end 500 slidably received within manual actuation member 242 and a lower end 502 configured to be positioned against a medium. Lower end 502 includes feet 506 (shown in FIG. 4) and print area indicators 508, 510 (shown in FIG. 3). Feet 506 constitute elastomeric members configured to be positioned against a medium to facilitate proper spacing of print device 238 from an underlying medium. Print area indicators 508 are indicia such as notches, grooves, projections, marks, printing and the like configured to indicate to a user of printer 214 a length dimension L along which printing can be formed by printer 214. Print area indicators 510 are similar to print area indicators 508 except that print area indicators 510 indicate a width dimension W along which printing may be performed by printer 214. In other embodiments, other indicia or structures may be used to indicate to a user the area of the underlying medium that may be printed upon by printer 214. In still other embodiments, feet 506 and indicators 508, 510 may be omitted.

Guide 237 is a mechanism configured to guide or direct movement of print device 238 relative to housing 236 and relative to an underlying medium. In the particular example illustrated, guide 237 is configured to guide linear movement of print device 238 along an axis 380 that is substantially parallel to a face of print device 238 and/or a plane of a face of a medium to be printed upon by printer 214. In the particular example illustrated, guide 237 includes an elongate support rod 514 slidably supporting print device 238 for movement along axis 380. Support rod 514 has opposite ends affixed to housing 236. In other embodiments, guide 237 may have other configurations. For example, in another embodiment, guide 237 may include one of a projection and a groove coupled to housing 236 and the other of a projection and a groove coupled to print device 238, wherein the projection is received within the groove and guides linear movement of print device 238 along axis 380.

Print device 238 constitutes a device configured to print indicia, pattern, image and the like upon a medium. In one embodiment, print device 238 constitutes a device configured to deposit a printing material or other material upon a medium. In another embodiment, print device 238 constitutes a device configured to otherwise interact with a medium such that a pattern, image and the like is formed upon a medium. For example, in another embodiment, print device 238 may be alternatively configured to selectively apply heat or pressure to a medium, wherein the medium is configured such that the application of heat or pressure results in an image, pattern or indicia being formed on or in the medium. In the particular example illustrated, print device 238 includes an inkjet print head 516 (shown in FIG. 3) configured to deposit ink or other fluid material upon a medium. In the particular example illustrated, print device 238 additionally includes an ink supply 518, wherein print head 516 and supply 518 form a cartridge 520 removably mounted to guide 237. In yet another embodiment, print head 516 or cartridge 520 may be fixedly or permanently coupled to guide 237 as part of printer 214.

Position sensing device 239 constitutes a device configured to sense the positioning of print device 238 relative to housing 236 and an underlying medium. In the particular embodiment illustrated, position device 239 includes an encoder strip 522 and reader 524. Encoder strip 522 constitutes a strip of readable material coupled to housing 236 along guide 237. Reader 524 is coupled to print device 238 so as to move with print device 238 along axis 380 and so as to read or sense the position identifying indicia provided along strip 522. In one embodiment, strip 522 and reader 524 cooperate in an optical manner to sense the positioning of print device 238 along axis 380. In other embodiments, strip 522 and reader 524 may cooperate in other manners to sense the positioning of print device 238. For example, in another embodiment, strip 522 and reader 524 may alternatively cooperate in a magnetic manner to indicate positioning print device 238. In still other embodiments, position device 239 may constitute other sensing devices or arrangements. The detected positioning of print device 238 by device 239 is transmitted to controller 260 to assist controller 260 in controlling print device 238.

Interconnect 249 comprises one or more structures configured to transmit control signals from controller 260 to print device 238. In the particular embodiment illustrated, interconnect 249 is a flexible electrical circuit interconnecting controller 260 and print device 238. In the embodiment illustrated, interconnect 249 is supported, contained and guided by transmission 244. In other embodiments, interconnect 249 may be guided to print device 238 by other structures. Moreover, in other embodiments, interconnect 249 may comprise other structures or may be omitted wherein control signals from controller 260 are communicated to print device 238 in another fashion such as through wireless communications.

Manual actuation member 242 constitutes one or more members movably coupled to housing 236 and configured to be manually depressed by a user's hand so as to receive force which is transmitted to print device 238 by transmission 244. In the particular embodiment illustrated, manual actuation member 242 slidably extends over and about upper end 502 of housing 236. In the particular example shown, manual actuation member 242 is retained to housing 236 by an internal projection 542 (shown in FIG. 4) slidably captured within an elongate channel 544 formed in housing 236 (shown in FIG. 3). Projection 542 and channel 544 cooperate to guide movement of manual actuation member 242 along axis 246 between a raised position (shown in FIGS. 4-6) and a lowered position (shown in FIG. 7). As shown by FIG. 4, axis 546 extends substantially perpendicular to axis 380. In other embodiments, manual actuation member 242 may have other configurations and may be movably coupled to housing 236 in other manners. For example, manual actuation member 242 may alternatively slide within housing 236. In still other embodiments, manual actuation member 242 may be provided by a button, pad or the like configured to be manually depressed or moved generally along axis 246.

Figure 6:
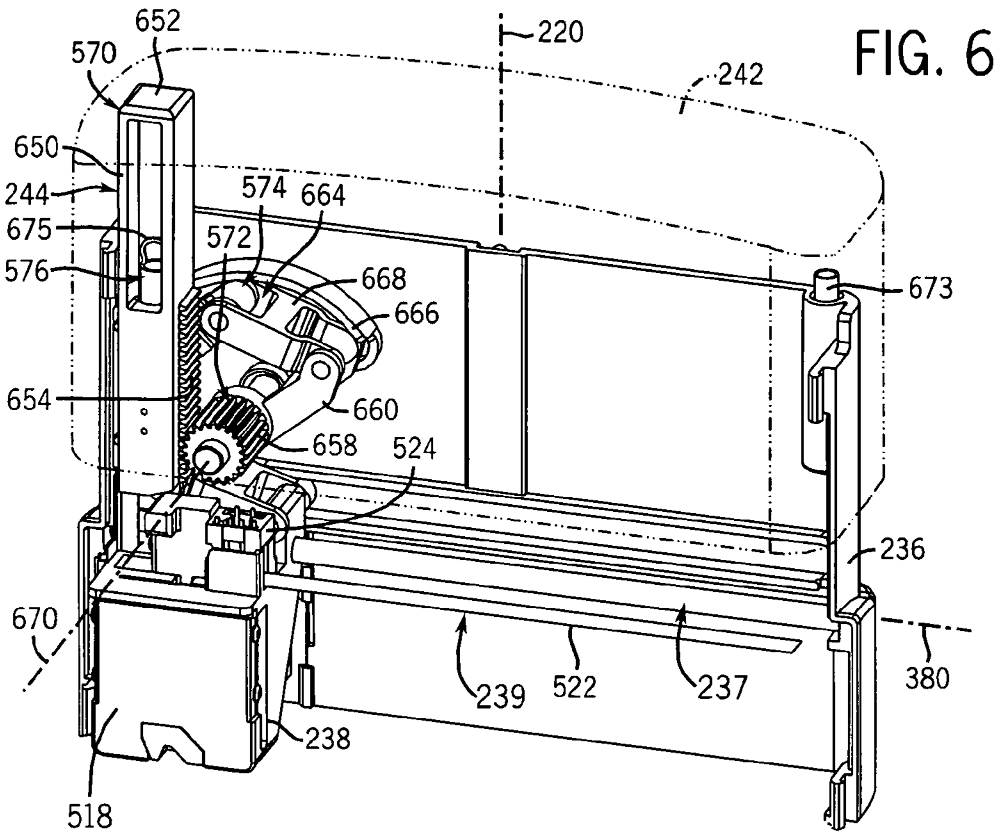
FIG. 6 is a fragmentary perspective view of the printer of FIG. 3 illustrating a print device in a first position according to one example embodiment.
Figure 7:
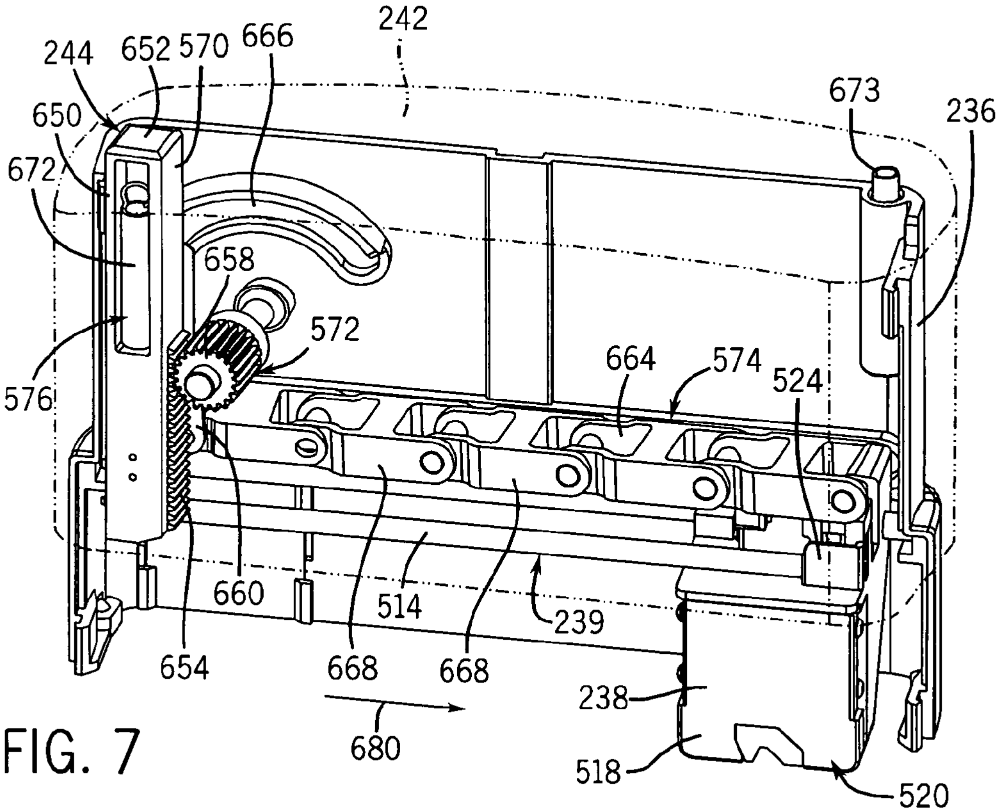
FIG. 7 is a fragmentary perspective view of the printer of FIG. 3 illustrating the print device in a second position according to one example embodiment.

Transmission 244 constitutes one or more structures configured to transmit manually applied force from manual actuation member 242 to print device 238 so as to move print device 238 along axis 380. As shown by FIGS. 6 and 7, transmission 244 includes linear drive 570, rotary drive 572, linear drive 574 and return bias 576. Linear drive 570 constitutes one or more devices configured to transmit manual force applied to manual actuation member 242 to rotary drive 572. In the particular embodiment illustrated, linear drive 570 includes rack gear 650 slidably coupled to housing 236 and including an upper end 652 and a toothed portion 654. Upper end 652 is configured to be engaged and depressed by manual actuation member 242. Toothed portion 654 extends along a portion of rack gear 650 and is configured to mesh with rotary drive 572. Upon being engaged by manual actuation member 242, rack gear 650 moves or slides relative to housing 236 between a raised position (shown in FIGS. 4-6) and a depressed or lowered position (shown in FIG. 7). Because rack gear 650 is slidably coupled to housing 236, manual actuation member 242 engages end 652 rather than being connected to rack gear 650. As a result, tolerances between housing 236 and manual actuation member 242 may be increased.

Rotary drive 572 constitutes one or more structures rotatably supported by housing 236 and configured to be rotatably driven by linear drive 570. Rotary drive 572 is further configured to transmit force to linear drive 574 upon being rotated such that print device 238 is moved or scanned along axis 380. In the particular example illustrated, rotary drive 572 includes a pinion gear 658 and arm 660. Pinion gear 658 is rotatably supported by housing 236 in meshing engagement with toothed portion 654 of rack gear 650. Arm 660 extends from pinion gear 658 and has an end coupled to linear drive 574. Upon downward depression of rack gear 650, pinion gear 658 rotates so as to rotate arm 660 and to move linear drive 574. Although transmission 244 is illustrated as including rack gear 650 and pinion gear 658 having teeth that are intermeshed to transmit force, in other embodiments, rack gear 650 and pinion gear 658 may alternatively be replaced with similar members that omit such teeth, wherein such members frictionally engage one another to transmit force.

Linear drive 574 includes one or more members or structures configured to transmit and convert rotary motion or torque received from rotary drive 572 to print device 238 so as to linearly move print device 238 along axis 380. In the particular example illustrated, linear drive 574 includes flexible drive member 664 and guide or track 666. Flexible drive member 264 constitutes one or more structures which are flexible and interconnect arm 660 of rotary drive 572 and print device 238. In the particular example illustrated, flexible drive member 264 includes a plurality of rigid links 668 pivotally connected to one another to form a linkage. Track 666 is coupled to an inside of housing 236 and is configured to guide or direct movement of flexible drive member 664 as it is moved about axis 670 of pinion gear 658 to move print device 238 along axis 380. Although track 666 is illustrated as being integrally formed as part of a single unitary body with housing 236, track 666 may alternatively be coupled to housing 236 in other fashions.

Return bias 576 constitutes one or more structures or mechanisms configured to return print device 238 to its original home position upon release of manual actuation member 242. In the particular example illustrated, return bias 576 includes bias members 672 and 673. Bias member 672 constitutes a structure configured to resiliently bias rack gear 650 towards its raised position so as to also bias print device 238 to its original or home position shown in FIGS. 4-5. In the particular example illustrated, bias member 672 constitutes a tension spring having a first end (not shown) connected to rack gear 650 and a second end 675 connected to housing 236. During depression of manual actuation member 242, rack gear 650 is moved towards the lowered position which results in bias member 672 being stretched or extended. Upon release of manual actuation member 242, bias member 672 returns to its original position, urging rack gear 650 and manual actuation member 242 to their raised positions which also results in print device 238 being returned to its original position. In the particular example illustrated, bias member 672 is contained or housed within rack gear 250. In other embodiments, bias member 672 may be provided at other locations and have other configurations.

Bias member 673 constitutes one or more structures configured to apply a bias force to additional portions of manual actuation member 242 such that an overall balanced force is applied to manual actuation member 242. Because bias members 672 and 673 are located substantially around and in close proximity to a perimeter of printer 214, a balanced biasing force is applied to manual actuation member 242 and internal space of printer 214 is conserved. In the particular example illustrated, bias member 673 comprises a compression spring supported by housing 236 on an opposite end of printer 214 as compared to bias member 672. In other embodiments, bias member 673 may comprise other bias members, may be located at other locations or may be omitted.

User interface 247 constitutes one or more devices configured to facilitate the input of instructions or data to printer 214 by an operator or user. Interface 247 may additionally provide information to the user of printer 214. In the particular example illustrated, user interface 247 includes power switch 734, display 736 and scroll controls 738, 740. Power switch 734 actuates the supply of power from power source 250 to controller 260 and further actuates controller 260 between an on state and an off state. Although power switch 534 is illustrated as a push button which may be used to toggle printer 214 between on and off states, power switch 204 may comprise other input mechanisms.

In the example illustrated, pinion gear 658 and arm 660 are configured to provide distance multiplication. In other words, pinion gear 658 and arm 660 of rotary drive 572 are configured such that depression of manual actuation member 242 by a first distance results in scanning or movement of print device 238 by a second greater distance. As a result, printing device 238 may be moved across a larger printing area with less corresponding movement of manual actuation member 242.

Display 536 is configured to display information to a user. In one embodiment, display 536 is configured to provide a user with a visual representation of an image, indicia, text and the like that may be printed. In the particular example illustrated, display 536 is further configured to present instructions and/or selections to a user for selection. For example, in one embodiment, the memory of controller 260 may include multiple images (i.e., text, pictures and the like) from which a user may choose to be printed by printer 214. Controls 538 and 540 constitute push buttons enabling a user to scroll through such various printing selections so as to select an image to be printed by printer 214. In other embodiments, display 736 and controls 738, 740 may be omitted or may have other configurations. In one embodiment, in lieu of interface 247 including a display 736, interface 247 may include various light emitting diodes or the like which are selectively illuminated to communicate information or selections to a user.

Power source 250 constitutes a source of power for controller 260 and potentially print device 238. In the particular example illustrated, power source 250 includes power supply board 726, internal power supply 728 and external power interface 730. Power supply board 726 constitutes a circuit board configured to route and selectively transmit power from supply 728 and/or interface 730 to controller 260 and print device 238. Internal power supply 728 constitutes a power storage unit contained within printer 214 for supplying and storing power. In one embodiment, internal power supply 728 constitutes a lithium-ion battery. In other embodiments, internal power supply 728 may comprise other power storage structures.

External power interface 730 constitutes an interface configured to facilitate the connection of printer 214 to an external source of power, such as a DC power transformer. External power interface 730 enables printer 214 to be operated using power transmitted directly from an external power source or enables internal power supply 728 to be charged. In other embodiments, printer 214 may alternatively omit either power supply 728 or an external power interface 730.

Data interface 256 (shown in FIG. 2) constitutes an interface device configured to facilitate transmission or input of image or display instruction files containing nozzle firing instructions and pixel actuation instructions to printer 214 and to controller 260 from an image source such as image source 112 (shown in FIG. 2). In the particular embodiment illustrated, interface 256 constitutes a Universal Serial Bus (USB) port. In other embodiments, data interface 256 may comprise other structures facilitating input of data to printer 214. For example, in one embodiment, data interface 256 may include a wireless transmitter and/or receiver configured to communicate with an external source of printing data wirelessly. In still other embodiments, interface 256 may be omitted, wherein image or printing data is stored in a memory permanently associated with controller 260 or wherein the image data is stored on a computer readable memory that is portable and which may be inserted or removed from printer 214.

Controller 260 constitutes one or more processing units configured to generate control signals for directing the printing operations by print device 238. In the illustrated embodiment, controller 260 is substantially similar to controllers 154 and 160 of printer 114. In particular, controller 260 includes a microprocessor for controlling power and an FPGA serving as a controller for remaining functions of printer 214. In the particular example illustrated, controller 260 generates such control signals based upon the sensed positioning of print device 238 as indicated by signals from position sensing device 239 and based further upon input received from user interface 247. In the particular embodiment illustrated, controller 260 further generates control signals based upon data received from data interface 256 (shown in FIG. 2). In other embodiments, controller 260 may generate such control signals based upon other factors. For example, in one embodiment, controller 260 may alternatively generate control signals based upon a sensed position of manual actuation member 242 in lieu of a sensed positioning of print device 238.

FIGS. 6 and 7 illustrate operation of printer 214. As shown by FIG. 7, depression of manual actuation member 242, rack gear 650 is moved to its lowered position causing rotary drive 572 to rotate in a counter-clockwise (as seen in FIG. 7) to unwind flexible drive member 664 so as to apply force to print device 238 in the direction indicated by arrow 680. This results in print device 238 also being moved in the direction indicated by arrow 680 so as to scan print device 238 forward. Upon the user releasing or lifting manual actuation member 242, bias member 672 returns rack gear 250 and manual actuation member 242 to their original raised positions. Lifting of rack gear 250 rotates pinion gear 658 of rotary drive 572 in a clockwise direction to rewind flexible drive member 264 and to return print device 238 to its initial home position (shown in FIG. 6).

Upon the initial depression of member 242, controller 260 generates control signals causing the nozzles of print head 516 to be pre-warmed. In one embodiment, circuitry warming occurs as print device to 38 is moved across guide 237 to the position shown in FIG. 7. Upon release of member 242, printing device 238 begins moving from the position shown in FIG. 7 to its home position shown in FIG. 6. In response to receiving signals from position sensing device 239 indicating such movement of printing device to 38, controller 260 generates control signals based upon the nozzle firing instructions previously received from image source 112 (shown in FIG. 2) causing the firing controller 163 (shown in FIG. 2) to fire the nozzles of print head 516 as printing device to 38 returns to the home position (shown in FIG. 6) to print an image previously selected by user via controls 738, 740.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:

a printhead including nozzles;

an interface configured to receive nozzle firing instructions from an external source; and a controller configured to generate control signals based on the nozzle firing instructions received by the interface, wherein with the nozzle firing instructions correspond to a first set of nozzle firing instructions and wherein the controller is configured to modify the first set of nozzle firing instructions to include a second set of nozzle firing instructions, wherein the second set of nozzle firing instructions comprise instructions for printing alphanumeric symbols.

2. The apparatus of claim 1 wherein a printer includes the printhead, the interface and the controller and the printer further comprises a display having pixels, wherein the interface is configured to receive pixel actuation instructions from an external source and wherein the controller is configured to generate display control signals based on the pixel actuation instructions received by the interface and wherein the display is configured to present an image in response to the display control signals.

3. The apparatus of claim 1, wherein the controller comprises a field programmable gate array (FPGA).

4. The apparatus of claim 3 wherein a printer includes the printhead, the interface and the controller and the printer further comprises:

a power supply configured to supply power to the FPGA;

a microcontroller configured to monitor activity of the FPGA, wherein the microcontroller discontinues transfer of power from the power supply to the FPGA after a period of inactivity by the FPGA.

5. The apparatus of claim 4 wherein the printer further comprises a power button configured to initiate transfer of power from the power supply to the FPGA, wherein the microcontroller enters a sleep mode after a period of inactivity until depression of the power button.

6. The apparatus of claim 1 further comprising a printer, wherein the printer includes the printhead, the interface and the controller and the printer further comprises a memory, wherein the second set of nozzle firing instructions are stored in the memory prior to receipt of the first set of nozzle firing instructions by the interface.

7. The apparatus of claim 1 further comprising a memory external to the printer storing the second set of nozzle firing instructions.

8. The apparatus of claim 1, wherein the controller includes a clock and wherein the second set of firing instructions comprises instructions for firing the nozzles to print a current date or time.

9. The apparatus of claim 1 further comprising:

an actuator configured to receive manually applied force, wherein the print head moves in response to the actuator receiving the manually applied force and wherein the controller modifies the first set of nozzle firing instructions with the second set of nozzle firing instructions in response to receipt of the manually applied force by the actuator.

10. The apparatus of claim 9 wherein the printer further comprises a transmission configured to transmit the manually applied force received by the actuator to the print head so as to move the printhead.

11. The apparatus of claim 1 wherein the printer further comprises an actuator configured to receive manually applied force, wherein the printhead moves in response to the actuator receiving the manually applied force and wherein the controller is configured to generate pre-warming control signals in response to receipt of the manually applied force by the actuator, wherein the nozzles are pre-warmed in response to the pre-warming control signals.

12. The apparatus of claim 1 further comprising a printer including the printhead, the interface and the controller and a computing device external to the printer, wherein the computing device is configured to generate the nozzle firing instructions based on image data and to communicate the nozzle firing instructions to the printer.

13. The apparatus of claim 1 further comprising a printer including the printhead, the interface and the controller and a computing device external to the printer, wherein the computing device is configured to generate pixel actuation instructions based upon display data and to communicate the pixel actuation instructions to the printer.

14. The apparatus of claim 1 wherein the interface comprises a wireless receiver.

15. The apparatus of claim 1, wherein the interface is configured to receive nozzle firing instructions from the external source that have been converted from a graphic format by the external source.

16. The apparatus of claim 1, wherein the interface is configured to receive nozzle firing instructions from the external source without having to translate nozzle firing instructions from higher level printing signals.

17. A printer comprising:

a printhead including nozzles;

an actuator configured to receive manually applied force;

a transmission configured to transmit the manually applied force from the actuator to the printhead to move the printhead;

a controller configured to generate control signals in response to receipt of the manually applied force by the actuator, wherein the nozzles are pre-warmed in response to the control signals.

18. The printer of claim 17 further comprising an interface configured to receive nozzle firing instructions from an external source, wherein the controller is configured to generate control signals based on the nozzle firing instructions received by the interface, wherein the nozzles fire in response to the control signals.

19. A method comprising:

receiving nozzle firing instructions based on image data from a computing device external to a printer without having to translate the nozzle firing instructions from higher level printing signals;

firing nozzles of the print head of the printer based on the nozzle firing instructions; and modifying a first set of nozzle firing instructions to include a second set of nozzle firing instructions and firing nozzles of the print head of the printer based upon the modified first set of firing instructions, with the first set of firing instructions corresponding to the nozzle firing instructions, wherein the second set of firing instructions comprises instructions for firing the nozzles to print a current date or time.

20. An apparatus comprising:

a printhead including nozzles;

an interface configured to receive nozzle firing instructions from an external source without having to translate the nozzle firing instructions from higher level printing signals; and a controller configured to generate control signals based on the nozzle firing instructions received by the interface, wherein a printer includes the printhead, the interface and the controller and the printer further comprises a display having pixels, wherein the interface is configured to receive a pixel actuation instructions from an external source and wherein the controller is configured to generate display control signals based on the pixel actuation instructions received by the interface and wherein the display is configured to present an image in response to the display control signals.

21. An apparatus comprising:

a printhead including nozzles;

an interface configured to receive nozzle firing instructions from an external source without having to translate the nozzle firing instructions from higher level printing signals; and a controller configured to generate control signals based on the nozzle firing instructions received by the interface, wherein the controller comprises a field programmable gate array (FPGA) and wherein a printer includes the printhead, the interface and the controller and the printer further comprises:

a power supply configured to supply power to the FPGA;

a microcontroller configured to monitor activity of the FPGA, wherein the microcontroller discontinues transfer of power from the power supply to the FPGA after a period of inactivity by the FPGA.

22. The apparatus of claim 21 wherein the printer further comprises a power button configured to initiate transfer of power from the power supply to the FPGA, wherein the microcontroller enters a sleep mode after a period of inactivity until depression of the power button.

23. An apparatus comprising:

a printhead including nozzles;

an interface configured to receive nozzle firing instructions from an external source; and a controller configured to generate control signals based on the nozzle firing instructions received by the interface, wherein the controller comprises a field programmable gate array (FPGA), wherein the printer further comprises an actuator configured to receive manually applied force, wherein the printhead moves in response to the actuator receiving the manually applied force and wherein the controller is configured to generate pre-warming control signals in response to receipt of the manually applied force by the actuator, wherein the nozzles are pre-warmed in response to the pre-warming control signals.

24. The apparatus of claim 23, wherein the interface is configured to receive nozzle firing instructions from the external source without having to translate nozzle firing instructions from higher level printing signals.

25. An apparatus comprising:

a printhead including nozzles;

an interface configured to receive nozzle firing instructions from an external source; and a controller configured to generate control signals based on the nozzle firing instructions received by the interface, wherein with the nozzle firing instructions correspond to a first set of nozzle firing instructions and wherein the controller is configured to modify the first set of nozzle firing instructions to include a second set of nozzle firing instructions;

a printer, wherein the printer includes the printhead, the interface and the controller and the printer further comprises a memory, wherein the second set of nozzle firing instructions are stored in the memory prior to receipt of the first set of nozzle firing instructions by the interface.

26. The apparatus of claim 25, wherein the interface is configured to receive nozzle firing instructions from the external source without having to translate nozzle firing instructions from higher level printing signals.

27. An apparatus comprising:

a printhead including nozzles;

an interface configured to receive nozzle firing instructions from an external source;

a controller configured to generate control signals based on the nozzle firing instructions received by the interface, wherein with the nozzle firing instructions correspond to a first set of nozzle firing instructions and wherein the controller is configured to modify the first set of nozzle firing instructions to include a second set of nozzle firing instructions; and an actuator configured to receive manually applied force, wherein the print head moves in response to the actuator receiving the manually applied force and wherein the controller modifies the first set of nozzle firing instructions with the second set of nozzle firing instructions in response to receipt of the manually applied force by the actuator.

28. The apparatus of claim 27, wherein the interface is configured to receive nozzle firing instructions from the external source without having to translate nozzle firing instructions from higher level printing signals.

29. An apparatus comprising:

a printhead including nozzles;

an interface configured to receive nozzle firing instructions from an external source; and a controller configured to generate control signals based on the nozzle firing instructions received by the interface, wherein the controller comprises a field programmable gate array (FPGA) and wherein a printer includes the printhead, the interface and the controller and the printer further comprises:

a power supply configured to supply power to the FPGA;

a microcontroller configured to monitor activity of the FPGA, wherein the microcontroller discontinues transfer of power from the power supply to the FPGA after a period of inactivity by the FPGA; and a power button configured to initiate transfer of power from the power supply to the FPGA, wherein the microcontroller enters a sleep mode after a period of inactivity until depression of the power button.

* * * * *